United States Patent Office 2,815,226
Patented Dec. 3, 1957

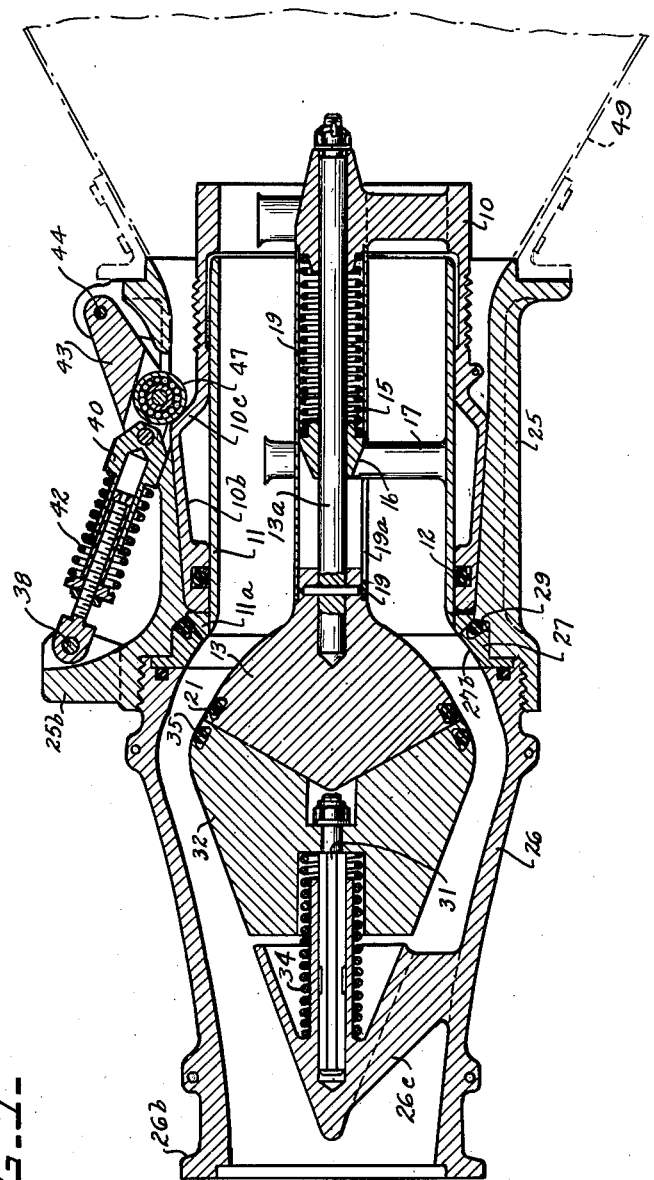

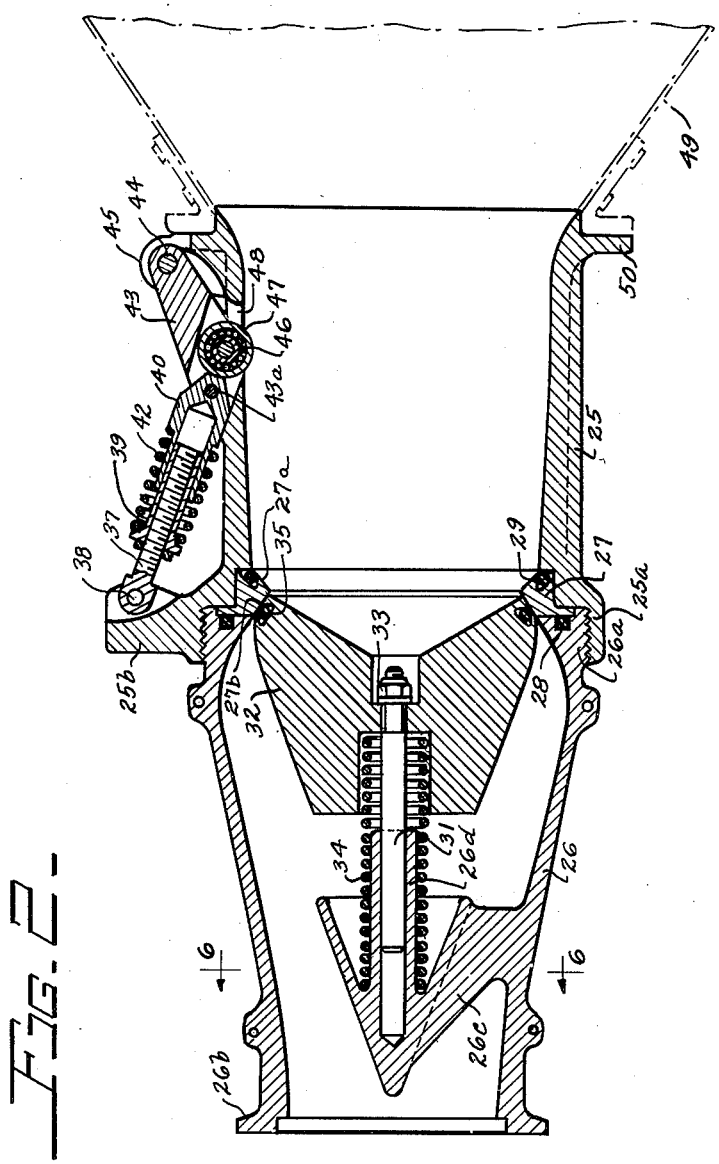

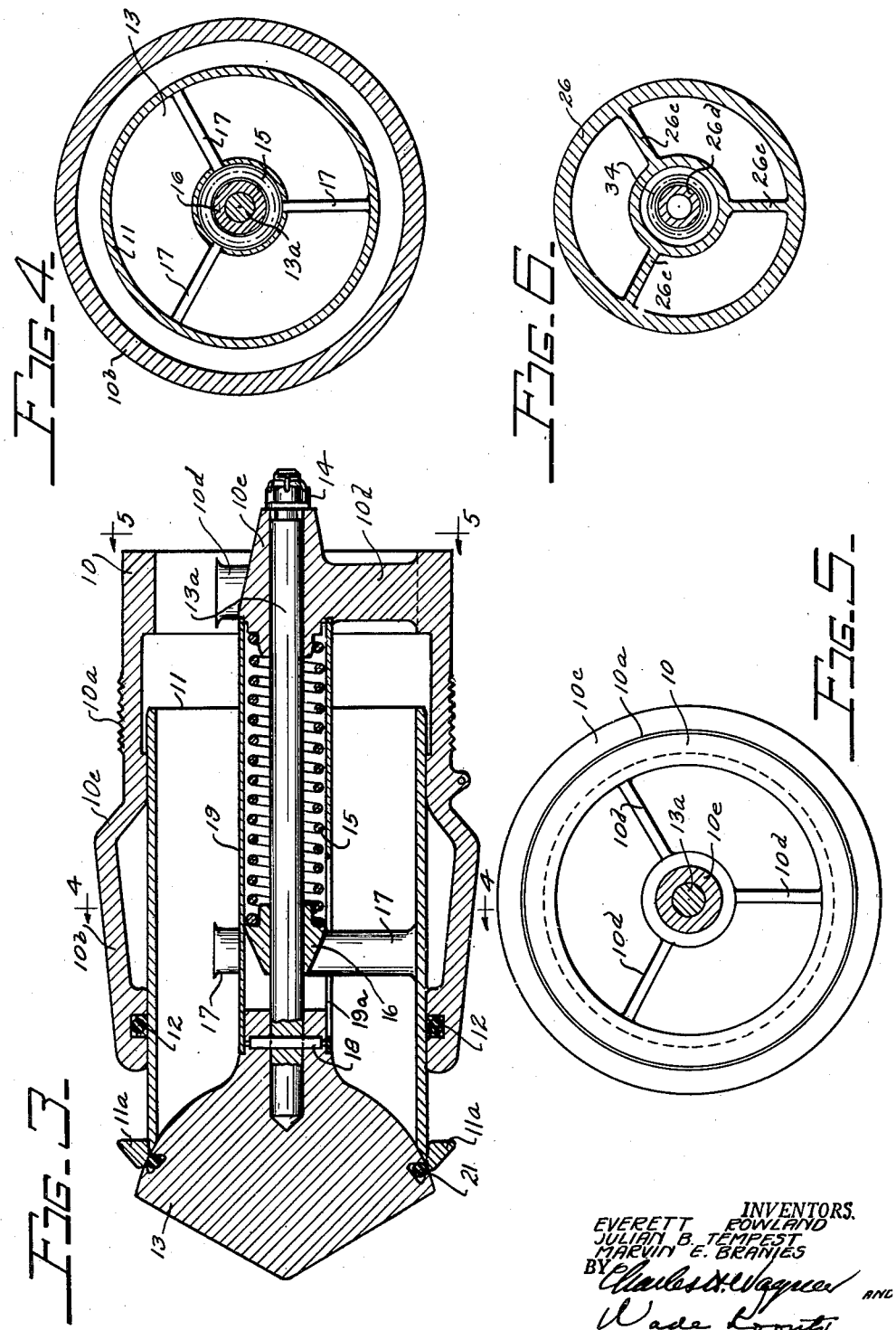

2,815,226
FLUID TRANSFER COUPLING

Everett Rowland, Springfield, Julian B. Tempest, Dayton, and Marvin E. Branies, Xenia, Ohio Application May 23, 1955, Serial No. 510,592

7 Claims. (Cl. 284—19)

(Granted under Title 35, U. S. Code (1952), sec. 266)

The invention described herein may be manufactured and used by or for the United States Government for governmental purposes without payment to us of any royalty thereon.

This invention relates to fluid transfer couplings and particularly to those used in apparatus for transferring fuel from one aircraft in flight to another.

The general object of the invention resides in an improved fluid transfer sectional coupling of which one section or unit is at the terminus of a supply line and the other mating section or unit is at the terminus of a receiving line.

More specifically, an object of the invention is to provide a sectional coupling characterized by minimum size and weight for a given flow capacity.

Further, the invention provides a sectional coupling which practically eliminates leakage during the process of connection or disconnection of the separable sections of the coupling, a feature which is especially important to fuel transference between aircraft in flight.

In the subject equipment one section of the coupling is a probe nozzle unit extending from one aircraft and at the terminus of its fuel line. As a rule, the probe nozzle unit is associated with the fuel receiving aircraft. The other section of the coupling is a reception unit for the nozzle unit. The reception unit will usually be associated with the supply or tanker aircraft and at the terminus of a supply line trailing from the tanker aircraft during refueling. Each of the sections of the coupling has normally closed valve means for fluid passages through the sections. To effect refueling the probe nozzle will be guided into the reception section. The valve means are so arranged that upon the probe nozzle moving into connection with the reception section, the valve means will open and bring the fluid passages of the respective sections into communication.

According to the invention, the valve means in each of the separable sections of the coupling will include a poppet valve centrally extending within a surrounding wall, and the fluid passage will be the space between the valve and the surrounding wall. This arrangement makes it possible to provide a fluid passage of comparatively large cross-sectional area for a given size of poppet valve stem and head. A feature of the invention is the provision of means whereby the respective poppet valves of the two sections coact to align themselves, each with the other, when the sections are brought together. More specifically, the invention involves the provision of mating concave and convex facial surfaces on the poppet valves of the respective sections, these facing surfaces being so configured that during interconnection of the sections, the surfaces will by mutual camming coaction force the poppet valves into centralized, longitudinal alignment with each other. According to the invention, the surrounding wall for the poppet valve in each section will be a generally tubular wall defining the outer perimeter for the fluid passage in the section while the poppet valve defines the inner perimeter for the fluid passage. The poppet valve will be disposed axially within its surrounding tubular wall and be mounted for axial displacement and against radial or transverse displacement relative to its surrounding wall. Accordingly, when the connection between the sections is being made, the camming coaction between the poppet valve faces will serve not only to effect axial alignment of the poppet valve on one section with the poppet valve in the other section but also will effect axial alignment of their surrounding tubular walls and of the fluid passage in the respective sections.

It is important in fluid transferring operation to prevent fluid surge, that is, it is desirable to provide for uniform, smooth rate of flow through the communicating fluid passages of the nozzle and reception sections when in connection with each other.

According to the invention, the inner and outer perimeters of the fluid passages are so contoured as to provide at each point of the communicating fluid passages a substantially uniform cross-sectional area, thus affording uniform surgeless fluid flow through the passages.

Another object of the invention is to provide improved means for releasably latching the two sections of the coupling to each other during their interconnection. Still another object of the invention is to provide improved valve means in the respective coupling sections which will coact during connection and disconnection of the sections to minimize leakage of the fluid.

Other objects of the invention will appear from the further portions of the specification, including the claims, and from the drawings, in which:

Fig. 1 is a central, longitudinal sectional view through the coupling showing the nozzle and reception units interconnected;

Fig. 2 is a similar sectional view through the nozzle reception unit when disconnected from the nozzle unit;

Fig. 3 is also a similar sectional view through the nozzle unit alone when disconnected;

Fig. 4 is a section on line 4—4 of Fig. 3;

Fig. 5 is a section on line 5—5 of Fig. 3; and

Fig. 6 is a section on line 6—6 of Fig. 2.

The sectional coupling with which the invention is concerned is particularly adapted for fuel transferring apparatus between aircraft in flight. The sectional coupling comprises a probe; the probe nozzle shown alone in Fig. 3, and a drogue; the nozzle reception shown by itself in Fig. 2, into which the probe is directed when fuel transference is to be effected.

The probe nozzle includes a tubular housing 10 with a generally cylindrical rear portion having external threads 10a to screw into a mounting stem (not shown) on a fuel receiving aircraft. The front portion or probe nose 10b of housing 10 is conically convergent with a gradual rise to the rear. The conically convergent nose 10b is followed by a reversely sloping conical portion 10c which has an acute drop toward the rear.

The housing 10 is formed on the interior with cylindrical guide walls for a slidable, cylindrical sleeve valve element 11. Between the housing 10 and sleeve 11 is a fluid sealing ring 12 recessed within housing 10 to prevent entry of fluid between the slidably contacting walls of the housing and sleeve.

As indicated in Figs. 3 and 5, the housing 10 at the rear end is formed with integral ribs 10d extending to a central hub 10e. Passing through hub 10e is a valve stem 13a of a poppet valve having a head 13 which, in conjunction with sleeve 11, comprises the valve means of the probe nozzle. A lock nut device 14 threaded onto the rear end of valve stem 13a abuts the rear of housing hub 10e and prevents forward displacement of the poppet valve 13—13a relative to the housing 10. Surrounding the valve stem is a coil spring 15, one end of which is mounted around a reduced projecting portion of the front end of the housing hub 10a and in abutment with a shouldered portion of the hub. The other end of spring 15 is similarly engaged with a conically tapered collar 16 slidably mounted on the valve stem 13a. The tapered side of the collar 16 is in flush abutment with the tapered free end of a radial arm 17 of the sleeve 11. Spring 15 is under compression and serves to maintain the sleeve 11 in a forward position relative to the poppet valve and to the housing 10. Valve 13 is secured by a pin 18 to the valve stem 13a. Surrounding and shielding the spring 15 as fully as possible is a tube 19 which is confined between shouldered portions of the housing hub 10e and the valve head 13. The tube 19 has an elongated slot 19a through which arm 17 of sleeve 11 passes and which allows for relative longitudinal displacement between the sleeve 11 and the tube.

It is to be noted that the poppet valve 13—13a and housing 10 are fixed to each other against relative longitudinal movement. Forward movement of the poppet valve relative to the housing is prevented by the lock nut device 14 abutting the rear end of hub 10e. Rearward movement of the poppet valve is prevented by the tube 19 interposed between the front end of the hub and the rear end of the poppet valve head 13. Radial or transverse movement of the poppet valve relative to the housing is effectively prevented by the extended engagement of the valve stem 13a with the central hole through housing hub 10e.

It is also to be noted that the sleeve 11 is concentrically disposed around the parts of the poppet valve including the tube 19, stem 13a and valve head 13. The valve head 13 has a bulbous back surface which normally engages, through a fluid sealing ring 21 recessed into the valve head, with the scarfed edge of a flange 11a permanently secured around the front end of the sleeve 11. The front edge of the sleeve also is scarfed to accommodate the curvature of the back of the valve head 13. The force of spring 15 normally holds the parts of the probe nozzle in the relation shown in Fig. 3, with the fluid seal ring 21 in thrust abutment with the flange 11a on the front end of the sleeve 11. With the parts of the probe nozzle in their normal, standby relation, the valve head 13 is closing the fluid passage between the poppet valve and the sleeve 11. The inside wall of sleeve 11 is the outer periphery of this fluid passage, while the tube 19 and back surface of the valve head 13, comprises the inner periphery of the fluid passage.

For a reason which will be made clear further on, the face of the poppet valve head 13 is conically convex with its center at the axis of the probe nozzle.

The reception unit or receptor for the described probe nozzle (Fig. 3) is shown alone in Fig. 2. The receptor includes a housing structure with two main tubular elements, a front element 25 and a rear element 26. Element 25 has a widened rear, internally threaded end 25a unit into which the externally threaded forward end 26a of element 26 is screwed. An interponent ring 27 is clamped between the ends 25a and 26a. Recessed into the radial, front edge of element 26 is a fluid sealing ring 28 which seals the joint between this element and ring 27. Another fluid sealing packing ring 29 is recessed into the beveled front face 27a of element 27 and partially extends into the joint between elements 25 and 27 to seal this joint. The housing element 26 is formed with a rear flange 26b for a V-band connection with the end of a hose (not shown) trailing from the supply or tanker aircraft. Integral with the element 26 is an inside mount 26c (also see Fig. 6) which is provided with a tubular projection 26d the bore of which is axially disposed relative to the nozzle receptor. Slidably seated in the bore of the projection 26d is a rod 31 which is secured to a poppet valve head 32. The rod 31 has a reduced front end which passes through a constricted axial hole in the valve head. The shoulder on the rod behind its reduced end is against the radial wall of the rear bore on the valve head and a nut and washer assembly 33 is applied to the threaded extremity of the rod, thus fixing the rod and the valve head 32 together. Telescoped on the projection 26d is a coil spring 34 between the mount 26c and the valve head 32. The spring 34 normally maintains the poppet valve 31—32 in its forward, closed position in which a fluid sealing ring 35 recessed in the periphery of the valve head 32 is in thrust engagement with the beveled rear face 27b of the interponent element 27. The valve 31—32 thus normally closes the fluid passage through the nozzle receptor. This fluid passage has, as its outer perimeter, the inside surrounding wall of the housing element 26 and, as its inner perimeter, the conically shaped body of the mount 26c and the similarly sloping body of the poppet valve head 32.

Mounted on the front housing element 25 is a toggle latch which includes a link 37 pivoted at 38 to an ear 25b of element 25. The link 37 is threaded into a sleeve 39 which provides a means of varying the force applied by coil spring 42. The sleeve itself has a free slidable fit within a bore in a link 40. Surrounding the link 40 and the sleeve 39 and confined between shoulders on this link and the sleeve is the coil spring 42. The link 40 is pivoted at 43a to a rocker 43 which is hinged at 44 to an ear 45 of the front housing element 25. Rotatably mounted on rocker 43 by means of a needle bearing 46 is a roller 47. The force of spring 42 normally maintains the toggle mechanism in collapsed condition shown in Fig. 2 with the roller 47 intruding, through an opening 48, into the interior of the housing element 25.

It is to be noted that the interior of the housing element 25 of the reception unit is conically divergent for the most part with a slope complementary to the conically convergent probe nose 10b of the probe nozzle. The mouth of the element 25 flares outwardly and a flared extension 49 of the mouth may be attached, as indicated in phantom, to the front flange 50 of the housing element 25.

When refueling is to take place, the fuel receiving aircraft from which the probe nozzle extends is flown toward the supply or tanker aircraft from which the nozzle receptor trails. Known means, not shown, sustains the nozzle receptor in substantially horizontal flight. The probe nozzle is guided by the cone 49 into the housing element 25 of the nozzle receptor. As the conically convergent probe nose 10b enters the housing element 25, it cams the roller 47 outwardly against the resistance of spring 42. The nose 10b has a gradual rise, about five degrees to the horizontal in the illustrated embodiment, and applies camming force at an appreciable angle to the moment arm of roller 47. Thus, probe nose 10b effects easy entry into the housing element 25, with comparatively little resistance from the spring-pressed roller 47. Before the probe nose passes the roller 47, the front flange element 11a of slidable sleeve 11 meets the inclined surface 27a of the interponent element 27 in the nozzle receptor. The front surface of element 11a is beveled similarly to the beveled surface 27a and moves into substantially flush contact with the latter surface, at the same time effecting thrust engagement with the pliable fluid sealing ring 29. In effect, then, the beveled surface 27a is a partially radially extending valve seat in the receptor for the front end of the slidable sleeve valve element 11 and when the sleeve element is in fluid-tight engagement with this valve seat, it produces a fluid-tight connection between the receptor unit and the nozzle unit, preliminary to the opening of the fluid passages in either unit.

After the sleeve element 11 stops against interposer element 27, the probe housing 10 and the poppet valve 13—13a continue to move forward as a unit relative to the sleeve elements, resistance to this movement being exerted by the spring 15. This forward movement of the housing 10 and poppet valve 13—13a relative to sleeve 11 continues until the front edge of the probe nose 10b stops against the back of the flange element 11a fixed to the front end of the sleeve. Meanwhile, the roller 47 of the toggle mechanism travels up the probe nose 10b and drops behind the reversely sloped intermediate portion 10c of the probe housing 10. The slope of portion 10c is comparatively steep, about 45° to the horizontal in the illustrated embodiment. The force between the portion 10c and the roller 47 is exerted along a slight angle to the movement arm of the roller. Hence, the roller has strong latching engagement with the portion 10c and substantially locks the probe nozzle in its fully inserted position in the nozzle receptor.

During the continued forward motion of the probe housing 10 and the poppet valve 13—13a to the latched position within the nozzle receptor, the conically convex face of the valve head 13 meets the complementary conically concave face of the valve head 32 and pushes the poppet valve 31—32 rearwardly against the resistance of spring 34. The final coupled relation of the parts is indicated in Figure 1. It is to be noted that after the sleeve 11 stopped against the element 27, the probe housing 10 and the probe nozzle poppet valve moved together forwardly of the sleeve 11 until the front edge of the housing 10 stops against flange 11a of the sleeve. Just before this occurred, the cam following roller 47 of the toggle latching mechanism dropped behind the cam drop 10c of the housing 10. Meanwhile, the poppet valve 13—13a of the probe nozzle has been moving forward beyond the rear end of the sleeve 11, opening the fluid passage between the sleeve and the valve head 13 and connected tube 19 which, in effect, is the outer part of the valve stem. Just as or slightly after the poppet valve head 13 starts moving forwardly away from the stopped sleeve 11 and begins to open the fluid passage in the probe nozzle, the conically concave face of the valve head 13 encounters the complementary conically concave face of the valve head 32 of the poppet valve in the nozzle receptor. The thrust of the valve head 13 against the valve head 32, by reason of their conical, complementary meshing faces centers or axially aligns the poppet valves with each other. Since the poppet valves are mounted to their respective probe nozzle and receptor housing structures against radial movement, the axial aligning interengagement of the valve heads also tends to force axial alignment of the structure and of the fluid passages between the structures and the valves. After the poppet head 13 meets the poppet head 32 the continued advance of the poppet head 13 pushes the poppet head 32 rearwardly against the resistance of the spring 34. Upon rearward movement of the valve head 32, it opens the fluid passage, in the nozzle receptor, between the housing element 26 and the head 32 and the conforming conical portion of the mount 26c for the valve stem 31.

It is to be noted that as the conical nose 10b of the probe nozzle fully seats in the complementary conically divergent opening in the reception housing element 25, it forces the housing structure of the receptor into axial alignment with the housing of the probe nozzle. Thus axial alignment of the nozzle receptor and the probe nozzle is forced by the coaction of probe nose 10b with the inside wall of the receptor housing 25 and also, indirectly as explained above by the self-aligning coaction between the poppet heads 13 and 32.

In the fully coupled condition of the probe nozzle and the nozzle receptor, shown in Fig. 1, the fluid passages in the nozzle and the receptor are completely open and in full communication, with one passage in smooth continuation of the other passage, so as to form a composite fluid duct through the coupling.

Attention is called to the feature of the invention involving the configuration of the valves and the surrounding walls of the sleeve 11 and the housing structure, including parts 26 and 27 of the receptor. These parts are so configured that in fully open positions of the valves, the valve stem tube 19 is concentrically surrounded by the sleeve 11, the bulbous back of poppet head 13 is substantially paralleled by the surrounding wall portions of the housing parts 26 and 27, and the body of valve head 32 and the conforming cone portion of mount 26c are in receding relation to the tapered rearwardly convergent surrounding wall of the housing element 26. The configurations are such that, except for the unavoidable obstruction of the arm 17 and the connecting portion between the mount 26c and the element 26, the fluid passages when in fully open, communicating relation have substantially equal cross-sectional areas at every point of their length. Thus, during fuel flow through the passages in the connected receptor and nozzle units, there will be a uniform flow volume at each point of the length of the passages. In other words, there will be no constriction of flow at any point of the fluid passages relative to any other point of these passages, so that fluid flow will be uniform and surgeless through the entire extent of the communicating fluid passages.

Smoothness of fluid flow through the connected fluid passages in the nozzle and receptor is further provided for by matching configuration of the inner and outer perimeters of the fluid passages. Thus, the poppet valve heads 32 and 13 are shaped as complementary portions of a pear-shaped body, so that when these valve heads are in contact with each other, as shown in Fig. 1, they form in continuation of each other the composite surfaces of a smooth pear-shaped inner perimetral portion of the fluid duct composed of the fluid passages in the connected nozzle and receptor. Likewise, the inside wall of the receptor housing element is curved in smooth continuation of the curve of the inner surface of the interponent element 27, while the adjacent inside surface of flange 11a and the front edge of the sleeve 11 are smoothly curved continuations of the curvature of the element 27. The outer perimeter of the composite fluid duct through the converted nozzle and receptor is thus a smooth-walled perimeter along the entire extent of the fluid duct.

It is to be noted further that the arrangement of the poppet valves in the nozzle and receptor as the inner perimeters of the fluid passages and the utilization of the surrounding walls of the sleeve 11 and the housing element 26 as the outer perimeters of the fluid passages provide for optimum cross-sectional areas of the fluid passages and hence for optimum fuel flow capacity through a comparatively small and light sectional coupling.

In order to disengage the probe nozzle from the receptor unit, the receiver aircraft, with which the nozzle is associated, starts to draw away from the tanker aircraft, with which the receptor unit is associated. Once a pull of adequate force is exerted to overcome the resistance of spring 42 to the rise of the cam follower roller 47 along and over the steep cam slope 10c of the probe nozzle housing 10, the probe nozzle housing 10 is free to withdraw from the nozzle receptor unit. The force required to pull the nozzle out of the receptor is a function of the resistance of toggle spring 42. Depending upon the spring adjustment, in the illustrated embodiment a force of 500–1000 lbs. pull is required to release the nozzle from the receptor. As the probe nozzle housing withdraws, the poppet valve 13—13a moves together with the housing to the rear and the poppet valve 31—32 in the reception unit follows under the influence of spring 34. Meanwhile, the sleeve 11 is being pressed by the spring 15 against the main coupling seal 29, preventing leakage between the reception unit and the nozzle. During the continued movement of the poppet valve head to the rear, its seal ring 21 returns to pressure engagement with the flange 11a on the sleeve 11, thus closing the fluid passage in the nozzle unit. At the same time, or slightly before, the poppet valve head 32 has advanced to bring the seal 35 in pressure engagement with the valve seat 27b in the reception unit, thus closing the fluid passage in the reception unit. The probe nozzle, after the fluid passages have been closed in the nozzle and the receptor, now withdraws as a unit, the parts 13, 11 and 10 being then in the relationship shown in Fig. 3, and the nozzle completely disconnects from and departs from the receptor.

While the invention has been shown and described in connection with the disclosed embodiment, it is to be understood that variations, changes, and departure from this embodiment may be made without departing from the spirit of the invention. It is desired, therefore, to be limited only in accordance with the following claims.

We claim:

1. A sectional fluid transfer coupling comprising a probe nozzle unit and a nozzle receptor unit into which the nozzle unit is insertable for interconnection of the units, each of said units mounting therein an axially disposed poppet valve for a surrounding fluid passage through its mounting unit, means in each of the units to urge the valves to normally close the fluid passages, the poppet valve of one unit having a poppet head with a conically convex face centered at the axis of the unit while the other poppet valve has a poppet head with a complementary, conically concave face, the poppet valves of the units being disposed to engage to open and bring the respective fluid passages into communication with each other upon insertion of the nozzle unit into the receptor unit, with the poppet head of the valve in the nozzle unit effecting face-to-face meshing engagement with the poppet head of the valve in the receptor unit to force axial alignment of the latter valve with the poppet valve in the nozzle unit and, thereby, to force the nozzle and receptor units into axial alignment upon their interconnection.

2. In apparatus to transfer fluid from one aircraft to another, a sectional coupling comprising a probe nozzle section to extend from one aircraft and a nozzle reception section to flexibly trail from the other aircraft, the two sections having mating forward ends and respectively containing axially centered valve devices, means in each section urging the valve devices to normally close respective fluid passages through the sections, said valve devices being disposed to meet, upon insertion of the nozzle section into the reception section, to open and bring the respective fluid passages into communication, each of said valve devices including a poppet valve, the forward end of the nozzle section being in the form of a conically convergent probe while the forward end of the reception section is formed with a complementary conically flaring opening facilitating entry of the probe, the poppet valves in the respective sections having complementary, conically shaped concave and convex faces interengaged upon connection of the two sections to each other, the complementary conical configurations of the probe end of the nozzle and the probe-receiving opening in the reception coupling and of the faces of the poppet valves in the respective sections serving upon full entry of the nozzle section into the reception section to force the reception section and its fluid passage into alinement with the nozzle section and its fluid passage, and means to releasably latch the two sections in coupled relationship.

3. The invention according to claim 2, the nozzle and reception sections respectively having inside walls abutting, when the sections are coupled together, to provide successive lengths of a substantially smooth, continuous outer periphery for a fluid duct composed of the fluid passages of the respective sections, and the poppet valves being formed as component meshing parts of a fluid duct, so that the fluid duct will present minimum substantially smooth, continuous inner periphery for said impedance to fluid flow, and a fluid-tight seal between the abutting edges of said inside walls of the respective sections.

4. A sectional, fluid transfer coupling comprising a probe nozzle and a nozzle receptor, said receptor including a tubular body internally provided intermediate its ends with spaced, transverse valve seats, a poppet valve slidably mounted inside the tubular body to the rear of one of said valve seats, means normally urging the poppet valve forwardly into thrust engagement with the latter one of said seats to close a substantially annular fluid passage between said valve and the surrounding tubular body, said body having a nozzle receiving extension in its front portion, said probe nozzle including a tubular member, a second poppet valve having its head spaced forwardly of said member and its stem extending inside the member into rigid connection with the rear of the member, a sleeve nested inside the member, means normally urging the sleeve forwardly into thrust engagement with the back of the second poppet valve to close a substantially annular fluid passage between the valve stem and the surrounding sleeve, said probe nozzle upon insertion into the receptor advancing as a unit until said sleeve comes into thrust engagement with the other of the mentioned valve seats inside the receptor and forms a fluid-tight connection between the nozzle and the receptor, the tubular member and the poppet valve of the nozzle moving forward relatively to the sleeve upon continued advance of the nozzle into the receptor to open the fluid passage between the sleeve and said valve stem, the second poppet valve during this continued advance abutting the poppet valve of the receptor and moving the latter valve rearwardly to open the fluid passage between the tubular body and the latter valve, said two fluid passages, one in the nozzle and the other in the receptor, thereupon being in connection to form a composite fluid passage, stop means on the sleeve and said tubular member to limit the advance of the member and connected poppet valve relative to the sleeve, and latch means engaging said tubular body and tubular member to releasably retain the nozzle and receptor in coupled condition.

5. The invention according to claim 4, said valve stem being tubular, and a coil spring inside the stem and acting at one end against the tubular member and at the other against the sleeve.

6. In apparatus to transfer fluid from one aircraft to another, a sectional coupling comprising a probe nozzle section and a mating nozzle receptor section, each section including an inside tubular wall and fluid valving means centrally disposed therein, and means in each section for biasing the valving means thereof to a closed position when the sections are disconnected from each other, the valving means of both sections being disposed to meet upon interconnection of the sections to overcome the biasing means to open, the respective valving means and the interior walls of the two sections meeting when the sections are interconnected to form respectively the inner and outer peripheral walls of a composite fluid duct through both sections, and said peripheral walls being so configured that said fluid duct is of generally annular and substantially uniform cross-sectional area throughout its length to thereby provide for surgeless, unconstricted fluid flow along the entire length of said duct.

7. A sectional, fluid transfer coupling comprising a nozzle unit and a receptor unit into which the nozzle unit is insertable for interconnection of the units, said units respectively having valves for fluid passages through the units, the receptor unit including a housing having an interior stop element at the forward end of the fluid passage therethrough, the nozzle unit including a tubular housing fitting into the receptor unit housing, a slidable sleeve nested within the nozzle unit housing and bounding the fluid passage through the nozzle unit, spring means in the nozzle unit to urge the sleeve into engagement with the valve therein to normally close the fluid passage therein, means in the receptor unit to urge the valve therein to normally close the fluid passage therein, said valves being disposed to engage to open upon insertion of the nozzle unit into the receptor unit and to disengage to reclose upon withdrawal of the nozzle unit, said spring means pressing the sleeve into engagement at its front end with said stop element to maintain leak-sealing connection between the respective nozzle and receptor fluid passages during the opening of the valves attending insertion of the nozzle unit into the receptor unit and during reclosing of the valves attending withdrawal of the nozzle unit from the receptor unit.

References Cited in the file of this patent

UNITED STATES PATENTS

| | | |
|---|---|---|
| 2,278,580 | Coles et al. | Apr. 7, 1942 |
| 2,384,628 | Krone et al. | Sept. 11, 1945 |
| 2,413,571 | Krone et al. | Dec. 31, 1946 |
| 2,461,818 | Hague | Feb. 15, 1949 |
| 2,634,927 | Smith et al. | Apr. 14, 1953 |
| 2,692,102 | Cobham et al. | Oct. 19, 1954 |
| 2,731,278 | Soderstrom | Jan. 17, 1956 |

FOREIGN PATENTS

| | | |
|---|---|---|
| 1,015,751 | France | Aug. 6, 1952 |